US012773903B2

(12) United States Patent
Gustavsson

(10) Patent No.: US 12,773,903 B2
(45) Date of Patent: Oct. 27, 2026

(54) CONTROL UNIT AND METHOD FOR A GAS TANK HEATING ARRANGEMENT ON A CONCRETE SURFACE PROCESSING MACHINE

(71) Applicant: HUSQVARNA AB, Huskvarna (SE)

(72) Inventor: Daniel Gustavsson, Soderkoping (SE)

(73) Assignee: HUSQVARNA AB, Huskvarna (SE)

( * ) Notice: Subject to any disclaimer, the term of this patent is extended or adjusted under 35 U.S.C. 154(b) by 357 days.

(21) Appl. No.: 18/712,412

(22) PCT Filed: Nov. 11, 2022

(86) PCT No.: PCT/SE2022/051059
§ 371 (c)(1),
(2) Date: May 22, 2024

(87) PCT Pub. No.: WO2023/091064
PCT Pub. Date: May 25, 2023

(65) Prior Publication Data
US 2025/0001855 A1 Jan. 2, 2025

(30) Foreign Application Priority Data
Nov. 22, 2021 (SE) .................................... 2151413-8
Nov. 22, 2021 (SE) .................................... 2151414-6

(51) Int. Cl.
*B60K 15/03* (2006.01)
*G01F 9/00* (2006.01)

(52) U.S. Cl.
CPC ........ *B60K 15/03006* (2013.01); *G01F 9/003* (2013.01); *B60K 2015/03013* (2013.01); *B60K 2015/03427* (2013.01)

(58) Field of Classification Search
CPC .... B60K 15/03006; B60K 2015/03013; B60K 2015/03427; G01F 9/003
(Continued)

(56) References Cited

U.S. PATENT DOCUMENTS 3,682,054 A * 8/1972 MacPhail .............. E01C 23/166 239/289
4,912,303 A 3/1990 Beavers et al.
(Continued)

FOREIGN PATENT DOCUMENTS

CA 1197277 A 11/1985
CA 2200034 A1 * 9/1997 .............. F17C 13/04
(Continued)

OTHER PUBLICATIONS

International Search Report and Written Opinion for PCT Application No. PCT/SE2022/051059, dated Jan. 24, 2023.
(Continued)

*Primary Examiner* — Raymond W Addie
(74) *Attorney, Agent, or Firm* — Burr & Forman

(57) ABSTRACT

A control unit (130, 700) arranged to control heating of a gas tank (120) for powering a concrete surface processing machine (100), wherein the concrete surface processing machine (100) comprises an electrical system (210) associated with a maximum allowable load, wherein the control unit (130, 700) comprises an input port (721) for receiving a signal associated with a present load of the electrical system (210), wherein the control unit (130, 700) comprises an output port (722) arranged to control an electrical heating element (220) associated with the gas tank (120), where the control unit (130, 700) is arranged to control the heating element (220) in dependence of the current load of the electrical system in relation to the maximum allowable load of the electrical system (210).

21 Claims, 4 Drawing Sheets

(58) Field of Classification Search
USPC .................................... 404/77, 79, 84.05, 95
See application file for complete search history.

(56) References Cited

U.S. PATENT DOCUMENTS

| | | | | |
|---|---|---|---|---|
| 5,010,868 | A * | 4/1991 | Clements .............. | F02D 19/022<br>123/577 |
| 6,421,594 | B1 * | 7/2002 | Erasmus ................. | E01C 19/48<br>701/50 |
| 7,248,791 | B2 | 7/2007 | Toth | |
| 8,636,442 | B1 * | 1/2014 | Sopko, Jr. ............... | E01C 19/48<br>701/50 |
| 8,801,325 | B1 * | 8/2014 | Garland .................. | E01C 7/187<br>404/95 |
| 10,036,347 | B1 * | 7/2018 | Sherry .................... | F02B 63/04 |
| 2007/0181561 | A1 | 8/2007 | Turletes et al. | |
| 2007/0193379 | A1 | 8/2007 | McCluskey | |
| 2009/0107972 | A1 * | 4/2009 | Naylor ................. | H05B 1/0244<br>219/528 |
| 2010/0232877 | A1 * | 9/2010 | Sanvik .................... | E04G 21/06<br>700/275 |
| 2010/0238013 | A1 | 9/2010 | Grothaus et al. | |
| 2011/0146111 | A1 * | 6/2011 | Pender .................... | E01H 4/023<br>37/219 |
| 2011/0268504 | A1 | 11/2011 | Marx et al. | |
| 2014/0253139 | A1 * | 9/2014 | Lindsey .................. | E01C 19/22<br>404/95 |
| 2015/0361626 | A1 * | 12/2015 | Trox ....................... | E01C 19/48<br>219/202 |
| 2019/0226640 | A1 | 7/2019 | Ben Belgacem-Strek et al. | |
| 2020/0256327 | A1 | 8/2020 | Van De Mortel et al. | |

FOREIGN PATENT DOCUMENTS

| | | | |
|---|---|---|---|
| GB | 2318861 | A | 5/1998 |
| JP | 63261063 | A | 10/1988 |
| JP | 6239150 | A2 | 8/1994 |
| KR | 20110041063 | A | 4/2011 |
| WO | 2006036143 | A1 | 4/2006 |
| WO | 2006099710 | A1 | 9/2006 |

OTHER PUBLICATIONS

Swedish Search Report & Office Action for Swedish patent application No. 2151413-8, dated Jun. 21, 2022.

Swedish Search Report & Office Action for Swedish patent application No. 2151414-6, dated Jun. 21, 2022.

* cited by examiner

CONTROL UNIT AND METHOD FOR A GAS TANK HEATING ARRANGEMENT ON A CONCRETE SURFACE PROCESSING MACHINE

TECHNICAL FIELD

The present disclosure relates to floor grinders and other concrete surface processing machines. There are disclosed techniques for heating a gas tank used to power a combustion engine of the concrete surface processing machines.

BACKGROUND

Concrete surfaces are commonly used for flooring in both domestic and industrial facilities. The size of concrete surface floors ranges from a few square meters for a domestic garage floor to thousands of square meters in larger industrial facilities. Concrete surfaces offer a cost efficient and durable flooring alternative and have therefore gained popularity over recent years.

A floor grinder can be used to efficiently process a concrete surface in order to, e.g., obtain a level surface and/or a surface having a desired surface texture. Floor grinders can also be used to polish concrete surface in order to obtain a glossy surface finish.

A gas-powered combustion engine, such as a propane-powered engine, may be used to power the floor grinder in an efficient manner. The fuel is then stored in liquid form in a gas tank or bottle. To properly feed the engine with a sufficient amount of gas, the fuel needs to go from liquid phase to gas phase at a high enough rate. On engines that lack liquid draw capability, this phase change needs to happen inside the gas tank. If not compensated for, the internal temperature of the fuel in the gas tank will decrease during use due to the phase change, eventually cooling the fuel in the gas tank to a temperature that prevents further machine operation, which is undesired.

SUMMARY

It is an object of the present disclosure to provide improved gas-powered floor grinders and other concrete surface processing machines. The machines comprise gas tank heating arrangements which enable a sufficient gas flow during extended periods of time without overloading the electrical system of the concrete surface processing machine.

The object is at least in part obtained by a control unit arranged to control heating of a gas tank for powering a concrete surface processing machine, wherein the concrete surface processing machine comprises an electrical system associated with a maximum allowable load. The control unit comprises an input port for receiving a signal associated with a present load of the electrical system and an output port arranged to control an electrical heating element associated with the gas tank. The control unit is arranged to control the heating element in dependence of the current load of the electrical system in relation to the maximum allowable load of the electrical system. In this way, the control unit can control the activity of the heating element, such as the duty cycle or the instantaneous power consumption of the heating element, so as to not overload the electrical system. This allows the system to adapt the operation of the heating element to the power consumption of other consumers in a dynamic manner and also to the amount of generated and/or available electrical energy in the system, which is an advantage since the heating element is then used only when surplus power is available for heating. The signal associated with the present load of the electrical system may, e.g., comprise a voltage signal, a current signal, or some other signal from which the load can be directly determined or indirectly inferred.

The signal associated with the load of the electrical system may also comprise a state of one or more auxiliary devices connected to the electrical system, which allows the control unit to not only estimate the present load on the system, but also predict the consequences of activating or inactivating various auxiliary functions or operations of the machine, which is an advantage since the electrical heating element may then be controlled in a proactive manner.

The control unit may be arranged to activate the electrical heating element when the present load is below a pre-determined load threshold. The activation may simply comprise an on/off operation, which is a cost-efficient manner of realizing the herein proposed techniques. The activation may also comprise activating a selection of sub-elements of the electrical heating element, which provides for finer granularity at the expense of an increase in complexity.

According to some other aspects, the control unit is arranged to modulate a power of the electrical heating element to maintain a pre-determined target load level of the electrical system. This way a more or less constant load can be maintained, where the power drawn by the electrical heating element is matched to the power consumption of the other power consumers connected to the electrical system, such that the overall power consumption is maintained at approximately a constant level.

According to some aspects, the control unit is arranged to determine a temperature of the fuel in the gas tank, and to control the heating element also in dependence of the temperature of the fuel in the gas tank. It may be unnecessary to heat a gas tank which is already warm. By determining the fuel temperature, such unnecessary heating can be avoided.

According to some aspects, the control unit is arranged to determine a delivered amount of gas from the gas tank, and to control the heating element in dependence of the delivered amount of gas from the gas tank. The delivered amount of gas from the gas tank can also be used to infer when heating is actually required, and when heating is not necessary for the operation of the machine. By controlling the heating element in dependence of the delivered amount of gas from the gas tank, unnecessary power consumption by the electrical heating element can be avoided.

According to some aspects, the control unit is arranged to trigger a warning signal in dependence of a temperature of the fuel in the gas tank and/or a delivered gas pressure of the gas tank. This warning signal may, e.g., notify an operator of the fact that the fuel is reaching critically low temperatures, or at least is about to reach critically low temperatures is nothing is done to heat the fuel. The operator may then take appropriate action to heat the fuel.

According to some aspects, the control unit is arranged to determine a temperature and/or a gas pressure gradient associated with the gas tank during operation of the concrete surface processing machine, and to determine a time period until the temperature and/or gas pressure expectedly goes below an operating threshold. Thus, the control unit is able to predict a point in time when operation will no longer be possible, which allows various pro-active operations to be performed. For instance, the control unit can be arranged to present the time period on a display device associated with the concrete surface processing machine. This alerts the operator, and allows the operator to take action in order to increase the temperature of the fuel, such that machine operation can be prolonged.

According to some aspects, the control unit is arranged to control one or more auxiliary functions of the concrete surface processing machine in dependence of the load of the electrical system. The control unit may, e.g., inactivate an auxiliary function in order to make room for heating the fuel in the gas tank.

According to some aspects, the control unit is arranged to control an idle motor speed of the concrete surface processing machine in dependence of a temperature of the fuel in the gas tank and/or a delivered gas pressure of the gas tank. This means that the machine can assume a form of heating mode, where the increased idle speed generates additional power that can be used to heat the fuel. The operator may engage this mode of operation, e.g., in response to being warned about critically low fuel temperature or delivery pressure.

The object is also obtained by a concrete surface processing machine comprising a gas-powered combustion engine, a gas tank, an electrical heating element associated with the gas tank, an electrical system associated with a maximum allowable load, and a control unit according to any previous claim.

According to some aspects, the electrical heating element in the concrete surface processing machine comprises an electrical heating plate and/or an electrical heating blanket and/or an electrical heating fan, which electrical heating element is optionally configured to at least partially enclose the gas tank, which improves heat transfer between the heating element and the fuel in the gas tank, which is an advantage.

According to some aspects, the concrete surface processing machine is arranged as a hybrid electric concrete surface processing machine comprising an electric machine powered from an electrical energy storage device and a combustion engine powered from the gas tank.

Another object of the disclosure is to provide a concrete surface processing machine comprising a control unit that is arranged to determine an amount of fuel remaining in a gas tank of the concrete surface processing machine based on a determined weight of the gas tank. The control unit is arranged to estimate a fuel consumption rate of the concrete surface processing machine, and also to determine a time period remaining until fuel depletion based on the determined amount of fuel remaining in the gas tank and on the estimated fuel consumption rate of the machine. This way an operator can obtain accurate information about the time period remaining until fuel depletion in an efficient manner. The control unit may, for instance, be arranged to estimate the fuel consumption rate of the machine based on a rate of change in the determined weight of the gas tank over time and/or to estimate the fuel consumption rate of the machine based on a predetermined fuel consumption rate of the machine.

According to some aspects, the predetermined fuel consumption rate of the machine is configured in dependence of a combustion engine speed. This allows for a more accurate estimation of fuel consumption rate.

According to some other the control unit is arranged to determine the amount of fuel remaining in the gas tank by performing a weight measurement of the gas tank when a concrete processing tool of the machine is in an inactive state of operation. This means that the weight measurement becomes more accurate.

According to a preferred embodiment, the control unit is arranged to determine a temperature and/or pressure state of the gas tank, and a temperature and/or pressure rate of change of the gas tank. The control unit is then in a position to determine a first time period as the time remaining until fuel depletion based on the amount of fuel remaining in the gas tank and on the fuel consumption rate of the machine, and also to determine a second time period as the time remaining until the temperature and/or pressure of the gas tank reaches a critically low operating temperature and/or pressure. The control unit is also arranged to determine a remaining time period of operation as the smallest of the first time period and the second time period. This remaining time period of operation then accounts for both remaining fuel and fuel temperature, which is an advantage.

A wireless device arranged to form a wireless connection to a control unit on a concrete surface processing machine is also disclosed herein. This wireless device is arranged to receive data indicative of a temperature of a gas tank on the concrete surface processing machine, and to trigger a warning signal in case the temperature is below an acceptable temperature level. This allows an operator to receive information indicative of the temperature of a gas tank on the concrete surface processing machine, which is an advantage since the operator can then better plan the concrete surface processing operation. The wireless device can also be arranged to receive data indicative of a remaining time period of operation, and to display the time period on a display of the wireless device.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

The present disclosure will now be described in more detail with reference to the appended drawings, where.

DETAILED DESCRIPTION

Figure 1:
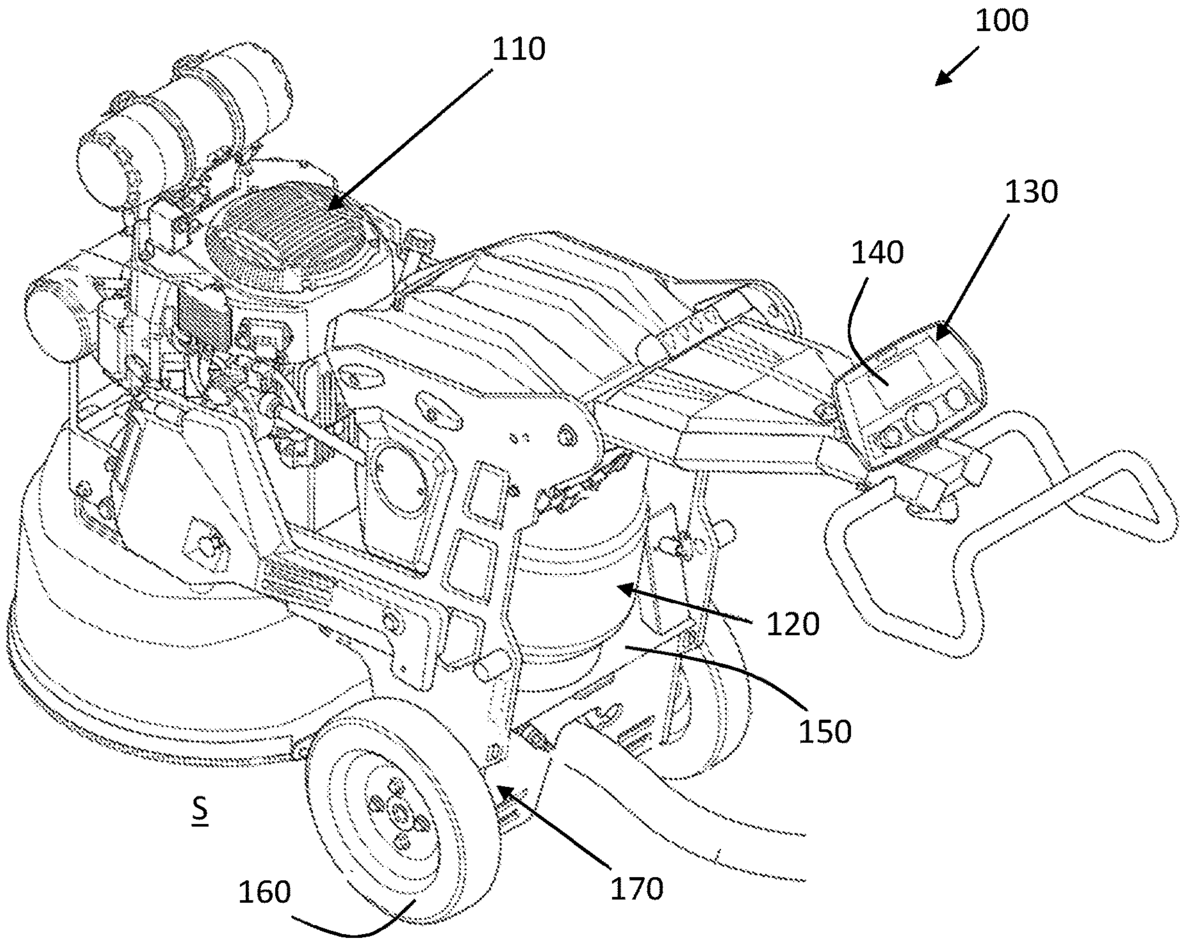
FIG. 1 shows an example gas-powered floor grinder, FIG. 2 schematically illustrates a tank heating system.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

FIG. 1 shows an example concrete surface processing machine 100 arranged to process a concrete surface S. The example in FIG. 1 is a propane-powered floor grinder. However, the techniques disclosed herein are equally applicable also to other types of concrete surface processing machines, such as power trowels, screeds, road saws, and also some heavy-duty dust extractors.

The machine 100 is powered by an onboard combustion engine 110, i.e., a combustion engine which shares the same supporting structure as the concrete surface processing tool on the machine. The onboard combustion engine 110 is fueled from a gas tank 120, such as a propane gas tank or bottle. Propane is one out of a group of liquefied petroleum gases (LP gases) which are commonly used as combustion engine fuels. The present disclosure is advantageously used in propane systems, although the techniques are not really limited to any particular form of gas-form fuel. Rather, the techniques disclosed herein can be applied in most gas-powered combustion engine systems.

On some example machines, such as the floor grinder shown in FIG. 1, the onboard gas-powered combustion engine 110 is arranged to drive a tool holder comprising one or more abrasive tools for processing a concrete surface S. The tool or tools held by the tool holder may be an abrasive grinding element, or an abrasive saw blade. The abrasives may comprise diamond granules in a known manner. The techniques disclosed herein are also applicable to dust extractors, power screeds, and the like.

The machine 100 is arranged to be controlled by a control unit 130, which may, e.g., be integrated into a display device 140 or assembled in some other location on the machine 100, such as in connection to a battery of the machine, or elsewhere. An example realization of a control unit 700 will be discussed in more detail below in connection to FIG. 7. The control unit 130 may be used to control various functions on the concrete surface processing machine 100, such as to control the motor speed and the propulsion and overall maneuvering of the machine. The control unit 130 is normally connected to some form of user interface, such as the display device 140, which allows interaction with an operator of the machine. Other user interfaces will be discussed below in connection to FIGS. 4 and 5.

Although the example machine in FIG. 1 is powered solely by a combustion engine 110, it is understood that the techniques discussed herein may be advantageously applied also to hybrid electric concrete surface processing machines which comprise an electric machine powered from an electrical energy storage, such as a battery, that is used in combination with the combustion engine powered from the gas tank 120. The combustion engine 110 may then be used to charge the electrical energy storage device that powers the electrical machine.

Gas-powered combustion engines 110 such as propane-powered engines use up a lot of gas when running under high loads. To keep the gas flow and pressure high enough for the engine to meet the power requirements, the gas needs to change state from liquid phase to gas phase at a sufficient rate, since otherwise the engine will suffer a reduction in output power or even malfunction. On engines that do not have liquid draw capability, this phase change needs to happen inside the gas tank 120. The phase change consumes a considerable amount of energy, i.e., about 120 W/kg of gas for some example machines.

If the gas tank 120 is not heated, the temperature inside the tank drops during operation of the concrete surface processing machine, eventually reaching a temperature where the gas tank 120 is no longer able to supply enough gas to the engine 110, i.e., gas at sufficient pressure and flow to run the engine 110.

Figure 2:
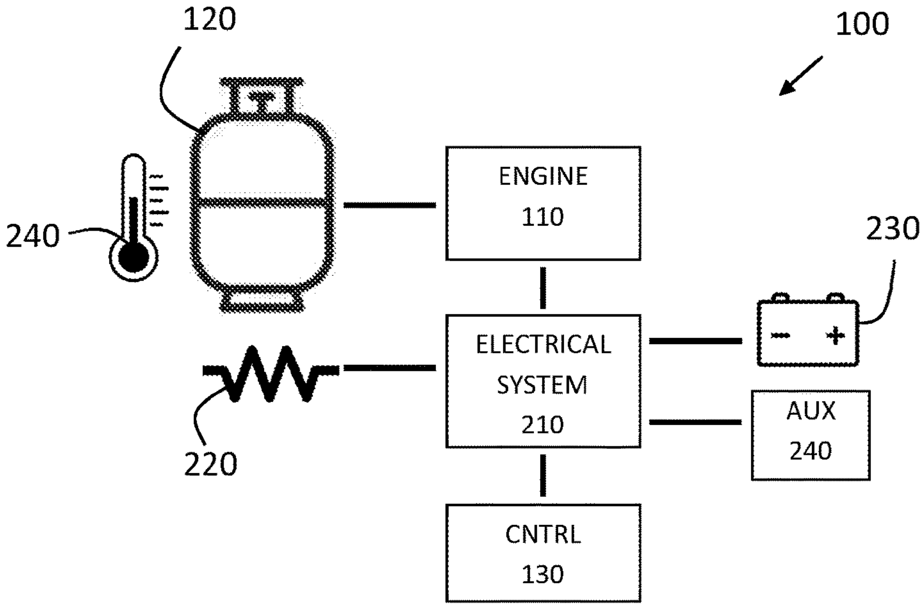

To prevent this from happening, with reference to FIG. 2, the electrical system 210 of the machine 100 can be used to power an electrical heating element 220. This electrical heating element 220 then replenishes at least part of the energy consumed by the phase transition of the gas from liquid phase to gas phase.

The electrical heating element 220 for heating the gas tank 120 may, e.g., comprise an electrical heating plate and/or an electrical heating blanket, and/or an electrical heating fan, which then draws at least part of its power from an on-board electrical energy storage device 230. An electrical heating plate 150 upon which the gas tank 120 rests is often a bit more efficient than the blanket, which is normally wrapped around the gas tank 120, since the heating plate is arranged under the gas tank 120 close to the fuel in the bottom of the tank, which is in liquid state and therefore able to transport heat more efficiently than the fuel at the upper side of the tank, which is in gas phase. The gas tank 120 may of course also be placed on top of a heating blanket, with similar effect.

The electrical heating element 220 is optionally configured to at least partially enclose the gas tank 120. For instance, the heating element can be arranged as a pliable material heating element into which the gas tank may sink in a distance, thereby improving the heat transfer between the heating element 220 and the fuel in the gas tank 120.

The electrical system 210 is often also used for other functions, such as to charge an electrical storage device 230, i.e., a battery or a super-capacitor. The electrical system 210 may also be used to supply electrical power to one or more auxiliary devices 240. An auxiliary device may, e.g., be a power socket for connecting one or more external tools, such as a dust extractor, or some other type of auxiliary equipment like a flood light.

An onboard generator arrangement can be integrated with or configured in connection to the engine 110 to provide electrical power to the electrical system 210. For instance, a generator device may be arranged in connection to a flywheel of the engine 110, or arranged as an external alternator connected to the engine via a transmission or the like. This generator arrangement may not be able to provide enough power to the electrical system to accommodate all the different power consuming functions, which may result in a power deficit and loss of one or more functions of the machine, which is undesired.

The gas-powered combustion engine 110 is mechanically connected to the onboard generator arrangement configured to feed electrical energy to the onboard electrical system 210. Thus, both the engine and the generator are integrated with the machine as onboard devices, as opposed to being separated from each other and connected by, e.g., cable.

The onboard generator arrangement can of course be arranged to charge the onboard electrical energy storage device 230 connected to the onboard electrical system 210. However, the electrical heating element 220 and the battery charger can also be supplied by electrical energy from separate generator arrangements and/or from electrical mains via cable.

The concrete surface processing machine 100 optionally comprises one or more electrical machines 170 connected to respective wheels 160 on the concrete surface processing machine 100, for propulsion of the machine 100 on the surface S. The electrical machines 170 make it more convenient to maneuver the machine around, and it is an advantage that they can be operated even if the engine is not running, since they are powered from the electrical energy storage device 230

The concrete surface processing machine 100 optionally also comprises a socket for connecting the onboard electrical system 210 to electrical mains. This way the electrical system can draw power to charge the battery and to heat up the gas tank without the engine running. The socket may be used with advantage during pauses in the construction work, i.e., during a lunch break or at night.

Figure 7:
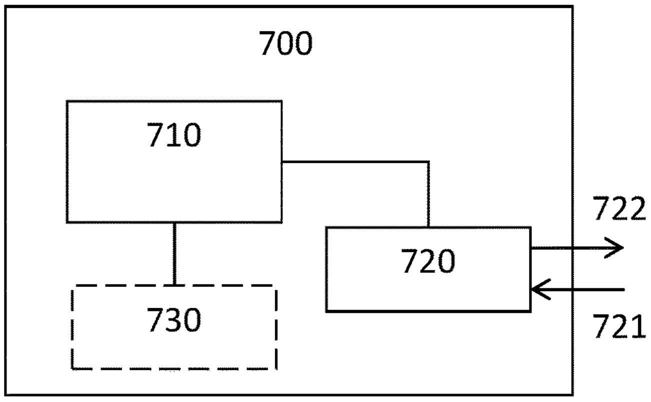
FIG. 7 illustrates example processing circuitry.
Figure 8:
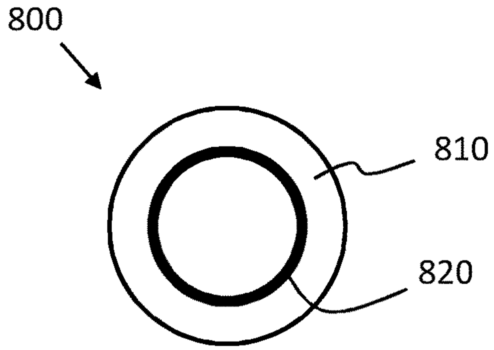
FIG. 8 shows an example computer program product.

With reference also to FIG. 7 which will be discussed in more detail below, to avoid power deficit in the electrical system of the machine 100 during use, there is disclosed herein a control unit 130, 700 arranged to control heating of fuel in a gas tank 120 for powering a concrete surface processing machine 100 such as the floor grinder in FIG. 1. The concrete surface processing machine 100 comprises an electrical system 210 as discussed above, i.e., a system configured to receive electrical power from a generator device connected to the engine 110, and to distribute this power between one or more power consumers of the machine 100. The control unit 130, 700 comprises an input port 721 for receiving a signal associated with a present load of the electrical system 210. The load signal may, e.g., comprise a voltage signal of the electrical system 210, which is indicative of the load of the electrical system 210 since the voltage in the system, e.g., measured over the poles on the energy storage device 230 drops when the electrical system 210 becomes overloaded. The load signal may also comprise a current signal, such as an output current from the generator device connected to the engine 110. This current signal is then indicative of the load in the electrical system 210 since its magnitude will increase with load. The load of the electrical system 210 may also be estimated or calculated from data indicative of which power consumers that are currently connected to the electrical system 210, and which out of these power consumers that are drawing power at any given point in time. Thus, optionally, the signal associated with the load of the electrical system 210 comprises a state of one or more auxiliary devices connected to the electrical system 240. For instance, suppose that the electrical system 210 is connected to a battery via a battery charger that the control unit has control of. The control unit may then calculate the load of the electrical system based on if the battery charger is active or inactive. The same is true if one or more auxiliary devices 240 are connected to the electrical system 210 of the machine 100, and controlled from the control unit 130. The control unit may then calculate a current load on the electrical system based on which auxiliary devices that are active, and how much power these auxiliary devices are expected to consume. Knowing in advance which auxiliary functions that will be activated, the control unit may also proactively control the heating element in order to avoids spikes in the load due to transients in the control of the electrical heating element.

The control unit 130, 700 also comprises an output port 722 arranged to control the electrical heating element 220, e.g., by controlling a relay or by controlling a circuit of the heating element configured to adjust the power consumption of the heating element. The control unit 130, 700 is thus arranged to control the heating element 220 in dependence of the load of the electrical system in relation to a maximum load level of the electrical system 210, such that the operation of the heating element 220 does not cause overload in the electrical system 210. Some example control strategies will be discussed below in connection to FIGS. 3A-C. The control unit may, e.g., simply turn a single fixed power heating element on and off in dependence of the electrical system load. Some more advanced heating elements may allow a more continuous control of the consumed power, such that the control unit can modulate the power drawn by the heating element in dependence of the overall load on the electrical system, such that the electrical system does not suffer overload. It is also possible to arrange an array of heating elements, which the control unit 130 can selectively activate, in order to control the amount of power drawn by the heating element at any given point in time, in dependence of the total load on the electrical system. Thus, if the battery is close to full charge, and no significant power is drawn by auxiliary equipment, then the control unit can direct almost all of the available power in the electrical system 210 to the heating element 220. However, if the operator then connects some auxiliary equipment, i.e., turns on a floodlight, then the control unit will respond to the increased load by decreasing the power directed to the heating element if the electrical system cannot accommodate both loads within the maximum allowable load.

Means for estimating tank temperature 240 may also be configured. The control unit 130 can then limit the power consumed by the heating element 220 so as to not overheat the gas tank 120, or at least so as to not heat the tank when it is not strictly necessary for the operation of the machine 100.

Thus, according to some aspects, the control unit 130, 700 controls one or more auxiliary functions of the concrete surface processing machine 100 in dependence of the load of the electrical system in relation to the maximum allowable load of the electrical system 210. If the load exceeds some acceptable threshold limit, the control unit may inactivate the auxiliary functions in order to make more power available for heating the gas tank. This inactivation may of course also be conditioned on the gas tank 120 having reached a critically low temperature which puts one or more main functions of the machine 100 at risk. According to an example, the control unit 130 may trigger a warning signal which informs the operator about the power overload issue and the risk of freezing the gas tank prematurely. The operator can then manually disengage one or more auxiliary functions, or accept that the control unit performs the inactivation of a selected number of auxiliary functions automatically.

The control unit 130, 700 is optionally also arranged to control an idle motor speed of the concrete surface processing machine 100 in dependence of a temperature of the fuel in the gas tank 120 and/or a delivered gas pressure of the gas tank 120. Thus, if the gas tank is reaching a dangerously low temperature, or if the flow of fuel out from the gas tank decreases below a required value, the control unit may increase an idle motor speed of the machine 100, and optionally also request that the operator ceases the concrete surface processing operation for a while until the gas tank has been sufficiently heated again to resume operation. The increased idle mode enables a higher amount of power to be generated by the electrical generator arrangement in the electrical system.

FIG. 3 illustrates some examples 300, 350, 370 of how the control unit 130, 700 may control the heating element 220 in dependence of the present load of the electrical system in relation to a maximum allowable load of the electrical system 210. The examples 300, 350 are shown as a graph of electrical system load over time, where the curve 310 represents load due to power consumers other than the electrical heating element, and the dashed areas 340, 360 indicate the operation of the electrical heating element 220. The sum of the two is then representative of the total power load on the electrical system.

Figure 3A:
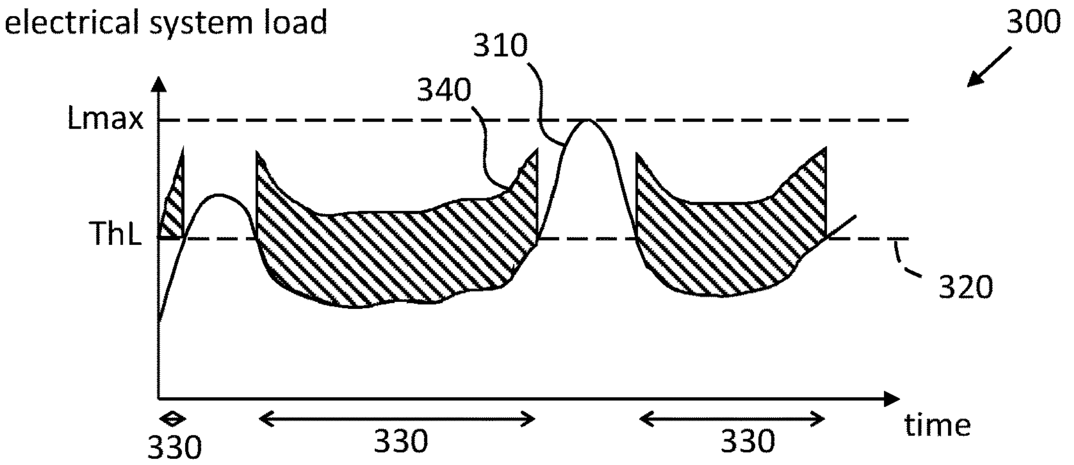
FIGS. 3A-C show example operations of a tank heating system.

In FIG. 3A, the control unit 130, 700 is arranged to activate 330 the electrical heating element 220 when the load is below a pre-determined load threshold ThL. Thus, the control unit implements a rather straight forward control strategy where the control unit continuously or periodically monitors the load in the system. Note how the overall load increases by the power consumed by the heating element during the active periods 330. Whenever the load in the system is low enough, i.e., below the threshold ThL, the opportunity for heating is ceased by the control unit, and the electrical heating element 220 is temporarily activated. This way the electrical system is not overloaded due to the onset of electrical heating, since the electrical heating element will only be activated when the other power consumers are not drawing a lot of power. This control strategy does not require an advanced heating element, since a simple on/off type of heating element is sufficient.

Figure 3B:
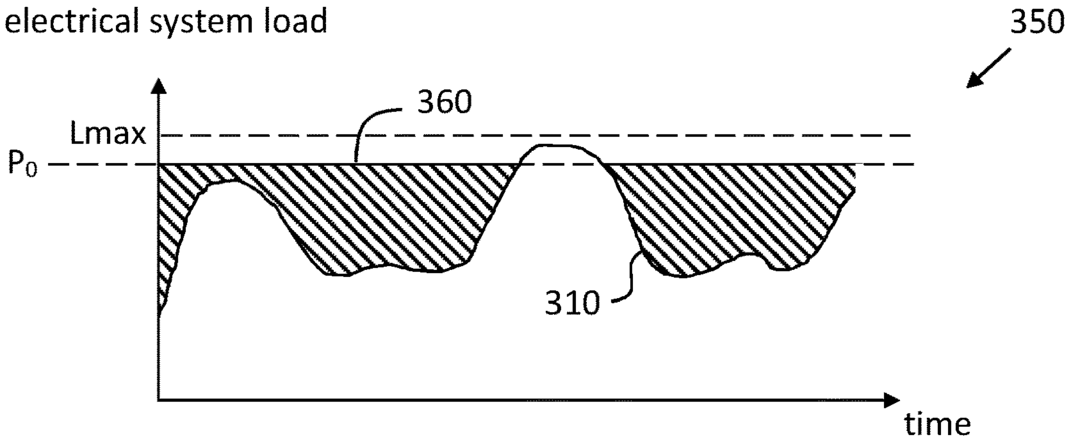

In FIG. 3B, the control unit 130, 700 is instead arranged to modulate a power drawn by the electrical heating element 220 to at least approximately maintain a target load level $P_0$ of the electrical system 210 below the maximum allowable load. In this mode of operation, the control unit continuously or periodically determines the current load on the electrical system 210, and controls the heating element to deliver a power determined in dependence of a difference between the current load in the system and the target load level $P_0$, such as to maintain the total load close to the target load level. The heating element is inactivated in case the other power consumers connected to the electrical system 210 together draw power which exceeds the threshold target load level $P_0$.

Figure 3C:
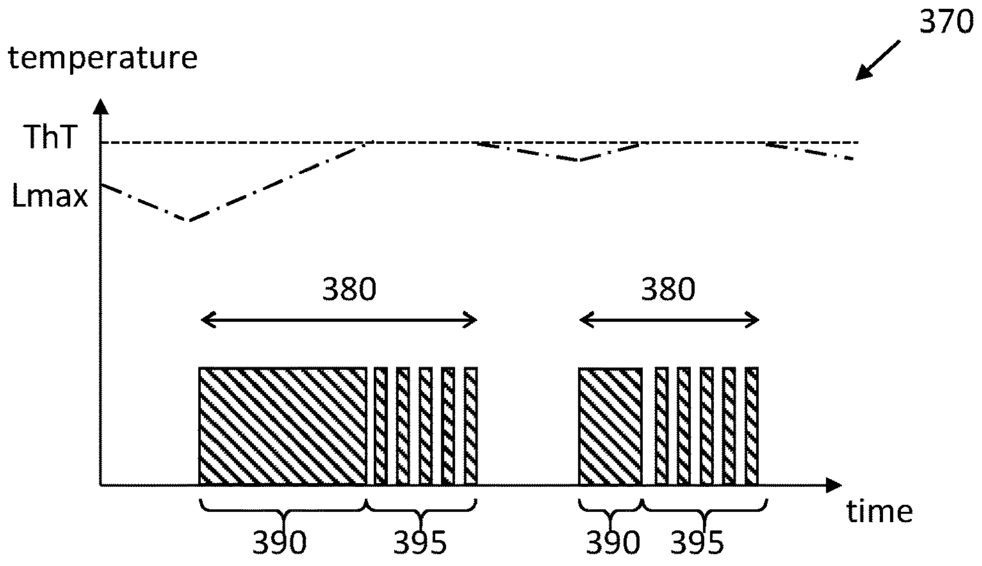

The control unit 130, 700 may also be arranged to determine a temperature 240 of the fuel in the gas tank 120 or a value associated with the temperature of the fuel, and to control the heating element 220 in dependence of the temperature of the fuel in the gas tank 120. This way the fuel in the gas tank can be kept below a target temperature ThT, such that the fuel is not heated by an excessive amount. As shown in FIG. 3C, the operation of the heating element may assume a constant heating mode 390 whenever the load from the power consumers is below the load threshold ThL enter into a maintenance heating mode 395 when the temperature has reached the target temperature ThT. The duty cycle, or on-time 380, is thus controlled in order to regulate the temperature of the fuel in the gas tank such that it does not exceed the target temperature ThT.

According to other aspects, the control unit 130, 700 is arranged to determine a delivered amount of gas from the gas tank 120, and to control the heating element 220 in dependence of the delivered amount of gas from the gas tank 120, in addition to the control based on the load on the electrical system 210. This allows the system to not heat the tank unnecessarily in case the supply pressure from the tank is at an acceptable level for operating the machine.

Figure 4:
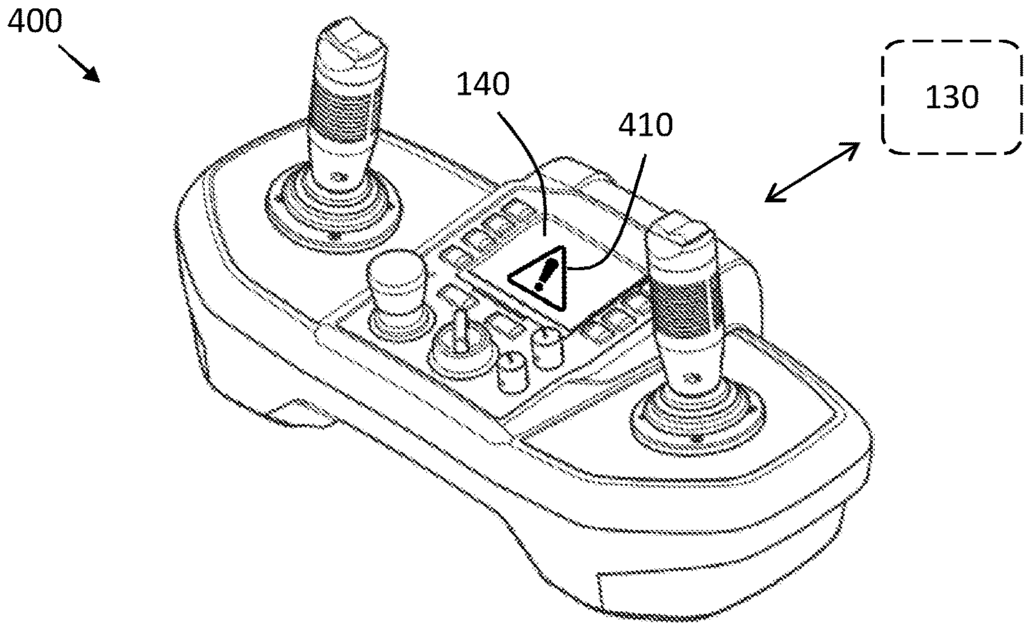
FIG. 4 shows an example remote control device.

FIG. 4 illustrates an example remote control device 400 which can be used to control the machine 100 from a distance. The remote control device 400 comprises a display unit 140. This display unit is similar to that shown in FIG. 1, and may assume basically the same function. A wireless device, such as a tablet or smartphone connected by wireless link 501 to the control unit 130, is exemplified in FIG. 5.

According to some aspects, the control unit 130, 700 is arranged to trigger a warning signal 410 in dependence of a temperature of the fuel in the gas tank 120 and/or a delivered gas pressure of the gas tank 120. Thus, if the supply of gas reaches dangerously low levels, i.e., levels at which the function of the machine 100 is at jeopardy, then the warning signal can be triggered in order to alert an operator of the fact. The operator can then take measures in order to provide further heating to the tank. For instance, the operator can pause operation and enable an increased motor speed idle mode in order to allow the control unit to heat up the gas tank using the electrical heating element. The operator can also inactivate one or more auxiliary functions in order to direct more power to the electrical heating element.

Thus, there is disclosed herein a wireless device 400, 500 arranged to form a wireless connection to a control unit 130, 700 on a concrete surface processing machine 100, wherein the wireless device is arranged to receive data indicate of a temperature of gas tank 120 on the concrete surface processing machine 100, and to trigger a warning signal in case the temperature is below an acceptable temperature level.

Figure 5:
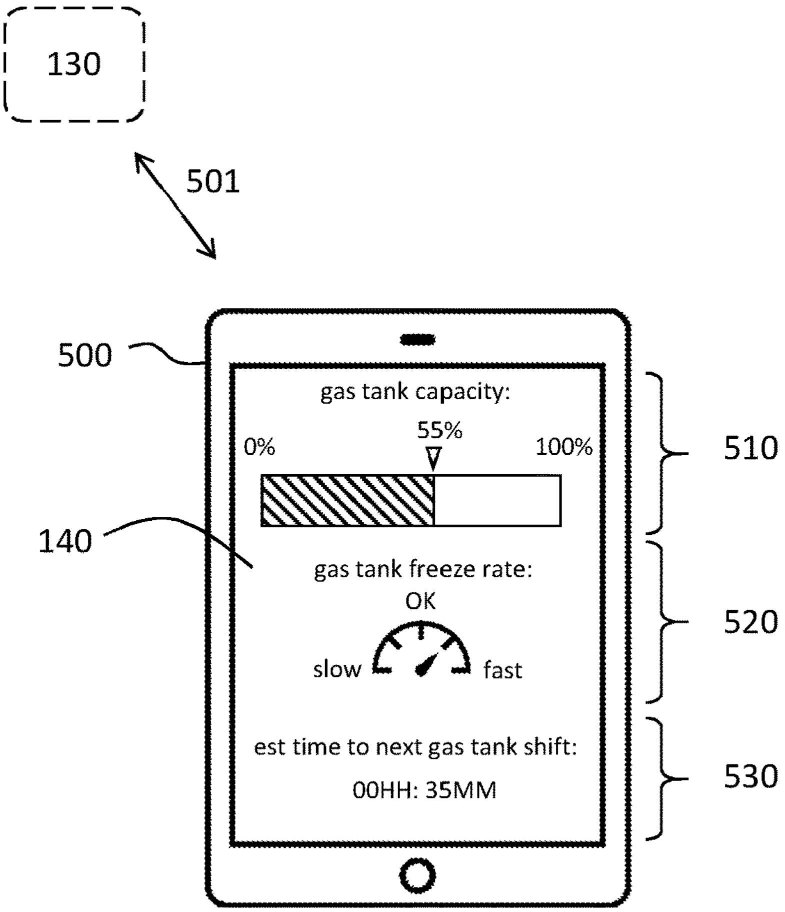
FIG. 5 illustrates an example portable display device.

With reference to FIG. 5, the control unit 130, 700 may also be arranged to determine a temperature and/or a gas pressure gradient associated with the gas tank during operation of the concrete surface processing machine 100, and to determine a time period until the temperature and/or gas pressure expectedly goes below an operating threshold. Thus, based on the rate of change in, e.g., gas tank temperature, the control unit can estimate how much longer the machine can be used without replacing the gas tank or stopping to heat up the gas tank again.

This enables the control unit 130 to display several types of information to an operator of the machine 100. For instance, the current tank capacity 510 can be indicated to the operator, which capacity may now account for the gas tank temperature as well as the amount of fuel left in the tank, such that the displayed capacity decreases if the tank starts to exhibit freezing tendencies. The current tank capacity 510 is then indicative of the smallest time period out of the time period until the gas fuel temperature becomes low enough to prevent further machine operation and the time period until the fuel in the gas tank runs out.

The amount of fuel remaining in the gas tank can be determined based on data associated with the weight of the fuel obtained from a scale, or simply be dead reckoning based on operating time since last replacement of a known size gas tank. For instance, the support surface upon which the gas tank rests can be equipped with a weight determining device, such as an integrated scale arrangement, and the weight of the empty bottle can be programmed into a memory device 730 (illustrated and discussed in connection to FIG. 7), such that the control unit 130 can determine the weight of the fuel remaining inside the gas tank 120 at any given point in time. A fuel consumption of the machine 100 can then be determined based on a change in weight, and the remaining operating time until the fuel is depleted can then be estimated by extrapolation of the change. This operating time can be compared to the time remaining until the fuel reaches a critically low temperature, and the smallest of the two time periods can be presented to the operator as the remaining operating time, e.g., on the display device 140. The weight of the empty tank can be determined based on a tank type and a database of empty tank weights, or simply by manually programming the tank weight into the control unit 130.

The remaining amount of fuel can also be determined based on, e.g., a flow meter arranged on the gas conduit between gas tank and engine configured to measure the amount of gas that is consumed. It is an advantage that the operator now receives information indicative of an expected operation time remaining until either the gas tank freezes or the fuel in the gas tank runs out.

There is disclosed herein a control unit 130, 700 for a concrete surface processing machine 100 which can be applied separate and independently from the other features discussed herein, i.e., which does not require the heating arrangements or the control of any electrical heating element 220.

The control unit 130, 700 is arranged to determine an amount of fuel remaining in a gas tank 120 of the concrete surface processing machine 100, and an associated fuel consumption rate of the machine 100, as discussed above, e.g., using a scale or dead reckoning. The control unit 130, 700 is also arranged to determine a temperature and/or pressure state of the gas tank 120, and a temperature and/or pressure rate of change of the gas tank 120, which allows the control unit to determine how fast the fuel cools down, and how long time which remains until the fuel reaches a critically low temperature and/or pressure that prevents operation.

The scales are advantageously operated when the concrete surface processing machine is at a stand-still, and more preferably when the combustion engine 110 is turned off, since then there is less vibration which could cause inaccuracies in the weight measurement. However, for most machines it is possible to low-pass filter the weight measurement, e.g., by averaging the output from the scales, to remove the effects from vibration on the determined weight of the gas tank and the fuel inside the gas tank.

The control unit 130, 700 is furthermore arranged to determine a first time period as the time remaining until fuel depletion based on the amount of fuel remaining in the gas tank 120 and on the fuel consumption rate of the machine 100, and to determine a second time period as the time remaining until the temperature and/or pressure of the gas tank 120 reaches a critically low operating temperature and/or pressure.

This allows the control unit 130, 700 to determine a remaining time period of operation as the smallest of the first time period and the second time period, which time period can, e.g., be presented to an operator on the display device 140 or on a wireless device such as the devices 400, 500 discussed in connection to FIGS. 4 and 5 herein.

There is also disclosed herein a control unit 130, 700 for a concrete surface processing machine 100 which is arranged to determine an amount of fuel remaining in a gas tank 120 of the concrete surface processing machine 100 based on a determined weight of the gas tank, as discussed above. The control unit 130, 700 is also arranged to determine a time period remaining until fuel depletion based on the determined amount of fuel remaining in the gas tank 120 and on an estimated fuel consumption rate of the machine 100. The fuel consumption rate can, e.g., be estimated based on a rate of change in the determined weight of the gas tank 120 over time, which rate of change can then be extrapolated to determine when the fuel is expected to run out. Alternatively or in combination, the control unit 130, 700 can estimate the fuel consumption rate of the machine 100 based on a predetermined fuel consumption rate of the machine 100 since most concrete surface processing machines consume more or less the same amount of fuel during normal concrete surface processing. The predetermined fuel consumption rate of the machine 100 may of course be preconfigured in dependence of the particular machine type and possibly also in dependence of the concrete surface processing operation to be performed, i.e., grinding, polishing, and so on. The predetermined fuel consumption rate of the machine 100 may also be configured as a function of combustion engine speed.

To reduce the impact of vibration on the weight measurement, the control unit 130, 700 is optionally arranged to determine the amount of fuel remaining in the gas tank 120 by performing a weight measurement of the gas tank 120 when a tool of the machine is in an inactive state of operation, i.e., when the machine is operating in idle mode. Even better weight measurements may be obtained of the control unit 130, 700 instead determines the amount of fuel remaining in a gas tank 120 by performing a weight measurement of the gas tank 120 when the combustion engine 110 of the concrete surface processing machine 100 is turned off.

The temperature and/or gas pressure gradient may optionally be illustrated to the operator as a status signal 520 indicating if the pressure gradient is in an acceptable interval, or if the pressure gradient is unusually high or low for the machine 100. This allows the operator to adjust the operation so as to not freeze the gas tank prematurely. Also, the control unit 130, 700 may optionally be arranged to present 530 the time period on the display device 140 as shown in FIG. 5, where the operator receives information about how long time that is left before the gas tank needs to be replaced due to having reached a too low temperature and/or due to being depleted of fuel.

Thus, the wireless device 400, 500 may be arranged to receive data indicative of a remaining time period of operation, and to display the time period on a display 140 of the wireless device, as illustrated by the example in FIG. 5.

Figure 6:
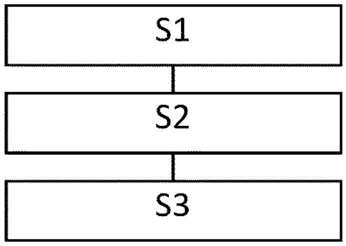
FIG. 6 is a flow chart illustrating a method.

FIG. 6 is a flow chart illustrating a method which summarizes the above discussion. There is illustrated a method for controlling heating of a gas tank 120 arranged to power a concrete surface processing machine 100, wherein the concrete surface processing machine 100 comprises an electrical system 210. The method comprises configuring a heating element 220 to heat the gas tank 120, receiving S2 a signal associated with a load of the electrical system 210, and controlling S3 the heating element 220 in dependence of the load of the electrical system in relation to a maximum allowable load of the electrical system 210.

FIG. 7 schematically illustrates, in terms of a number of functional units, the general components of the control unit 700 for realizing at least some of the techniques discussed herein. Processing circuitry 710 is provided using any combination of one or more of a suitable central processing unit CPU, multiprocessor, microcontroller, digital signal processor DSP, etc., capable of executing software instructions stored in a computer program product, e.g. in the form of a storage medium 730. The processing circuitry 710 may further be provided as at least one application specific integrated circuit ASIC, or field programmable gate array FPGA.

Particularly, the processing circuitry 710 is configured to cause, e.g., the floor grinder 100 and/or the control panel display unit 140 to perform a set of operations, or steps, such as the methods discussed above. For example, the storage medium 730 may store the set of operations, and the processing circuitry 710 may be configured to retrieve the set of operations from the storage medium 730 to cause the device to perform the set of operations. The set of operations may be provided as a set of executable instructions. Thus, the processing circuitry 710 is thereby arranged to execute methods as herein disclosed.

The storage medium 730 may also comprise persistent storage, which, for example, can be any single one or combination of magnetic memory module, optical memory module, solid state memory module or even remotely mounted memory module.

The circuit may further comprise an interface 720 for communications with at least one external device. As such the interface 720 may comprise one or more transmitters and receivers, comprising analogue and digital components and a suitable number of ports for wireline or wireless communication.

The processing circuitry 710 controls the general operation of the control panel, e.g., by sending data and control signals to the interface 720 and the storage medium 730, by receiving data and reports from the interface 720, and by retrieving data and instructions from the storage medium 730.

The invention claimed is:

1. A control unit arranged to control heating of a gas tank for powering a concrete surface processing machine, wherein the concrete surface processing machine comprises an electrical system associated with a maximum allowable load, wherein the control unit comprises an input port for receiving a signal associated with a present load of the electrical system, wherein the control unit comprises an output port arranged to control an electrical heating element associated with the gas tank, and wherein the control unit is arranged to control the heating element in dependence of the current load of the electrical system in relation to the maximum allowable load of the electrical system.

2. The control unit according to claim 1, wherein the signal associated with the load of the electrical system comprises a voltage signal, a current signal, or a state of one or more auxiliary devices connected to the electrical system.

3. The control unit according to claim 1, wherein the control unit is arranged to activate the electrical heating element when the present load is below a pre-determined load threshold.

4. The control unit according to claim 1, wherein the control unit is arranged to modulate a power of the electrical heating element to maintain a pre-determined target load level of the electrical system configured at or below the maximum allowable load level.

5. The control unit according to claim 1, wherein the control unit is arranged to determine a temperature of the fuel in the gas tank, and to control the heating element also in dependence of the temperature of the fuel in the gas tank, or wherein the control unit is arranged to determine a delivered amount of gas from the gas tank, and to control the heating element in dependence of the delivered amount of gas from the gas tank.

6. The control unit according to claim 1, wherein the control unit is arranged to trigger a warning signal in dependence of a temperature of the fuel in the gas tank and/or a delivered gas pressure of the gas tank.

7. The control unit according to claim 1, wherein the control unit is arranged to determine a temperature and/or a gas pressure gradient associated with the gas tank during operation of the concrete surface processing machine, and to determine a time period until the temperature and/or gas pressure expectedly goes below an operating threshold of the concrete surface processing machine.

8. The control unit according to claim 7, wherein the control unit is arranged to present the time period on a display device associated with the concrete surface processing machine.

9. The control unit according to claim 1, wherein the control unit is arranged to control one or more auxiliary functions of the concrete surface processing machine in dependence of the load of the electrical system in relation to the maximum allowable load of the electrical system, or wherein the control unit is arranged to control an idle motor speed of the concrete surface processing machine in dependence of a temperature of the fuel in the gas tank and/or a delivered gas pressure of the gas tank.

10. A concrete surface processing machine comprising an onboard gas-powered combustion engine, an onboard gas tank, an onboard electrical heating element associated with the gas tank, an onboard electrical system associated with a maximum allowable load, and the control unit according to claim 1.

11. The concrete surface processing machine according to claim 10, wherein the onboard gas-powered combustion engine is mechanically connected to an onboard generator arrangement configured to feed electrical energy to the onboard electrical system.

12. The concrete surface processing machine according to claim 11, wherein the onboard generator arrangement is arranged to charge an onboard electrical energy storage device connected to the onboard electrical system.

13. The concrete surface processing machine according to claim 12, wherein the concrete surface processing machine comprises one or more onboard electrical machines connected to respective wheels on the concrete surface processing machine, for propulsion of the machine on the surface.

14. The concrete surface processing machine according to claim 10, comprising a socket for connecting the onboard electrical system to electrical mains, or comprising an onboard electrical energy storage device connected to the onboard electrical system, wherein the electrical energy storage device is arranged to at least partly power the onboard electrical heating element associated with the gas tank.

15. The concrete surface processing machine according to claim 10, wherein the onboard electrical heating element comprises an electrical heating plate and/or an electrical heating blanket and/or an electrical heating fan, or wherein the onboard electrical heating element is configured to at least partially enclose the gas tank.

16. The concrete surface processing machine according to claim 14, constituted by any of: a floor grinder, a power trowel, a road saw, a power screed, or a heavy-duty dust extractor, and wherein the onboard gas-powered combustion engine is arranged to drive a tool holder comprising one or more abrasive tools for processing a concrete surface.

17. The concrete surface processing machine according to claim 10, arranged as a hybrid electric concrete surface processing machine comprising an electric machine powered from an electrical energy storage device and a combustion engine powered from the gas tank.

18. A control unit for a concrete surface processing machine, wherein the control unit is arranged to determine an amount of fuel remaining in a gas tank of the concrete surface processing machine, and an associated fuel consumption rate of the machine, wherein the control unit is arranged to determine a temperature and/or pressure state of the gas tank, and a temperature and/or pressure rate of change of the gas tank, wherein the control unit is arranged to determine a first time period as the time remaining until fuel depletion based on the amount of fuel remaining in the gas tank and on the fuel consumption rate of the machine, wherein the control unit is arranged to determine a second time period as the time remaining until the temperature and/or pressure of the gas tank reaches a critically low operating temperature and/or pressure, wherein the control unit is arranged to determine a remaining time period of operation as the smallest of the first time period and the second time period.

19. A concrete surface processing machine comprising a control unit, wherein the control unit is arranged to determine an amount of fuel remaining in a gas tank of the concrete surface processing machine based on a determined weight of the gas tank, wherein the control unit is arranged to estimate a fuel consumption rate of the concrete surface processing machine, wherein the control unit is arranged to determine a time period remaining until fuel depletion based on the determined amount of fuel remaining in the gas tank and on the estimated fuel consumption rate of the machine.

20. The concrete surface processing machine according to claim 19, wherein the control unit is arranged to estimate the fuel consumption rate of the machine based on a rate of change in the determined weight of the gas tank over time or based on a predetermined fuel consumption rate of the machine and/or combustion engine speed.

21. The concrete surface processing machine according to claim 19, arranged to determine the amount of fuel remaining in the gas tank by performing a weight measurement of the gas tank: when a concrete processing tool of the machine is in an inactive state of operation, when a combustion engine of the concrete surface processing machine is turned off, or by averaging or low-pass filtering a sequence of weight measurements of the gas tank.

* * * * *